RADIANT ENERGY CONTROL SYSTEM

Filed March 19, 1948 3 Sheets-Sheet 1

INVENTOR
W. SHOCKLEY
BY
Stanley B. Kent
ATTORNEY

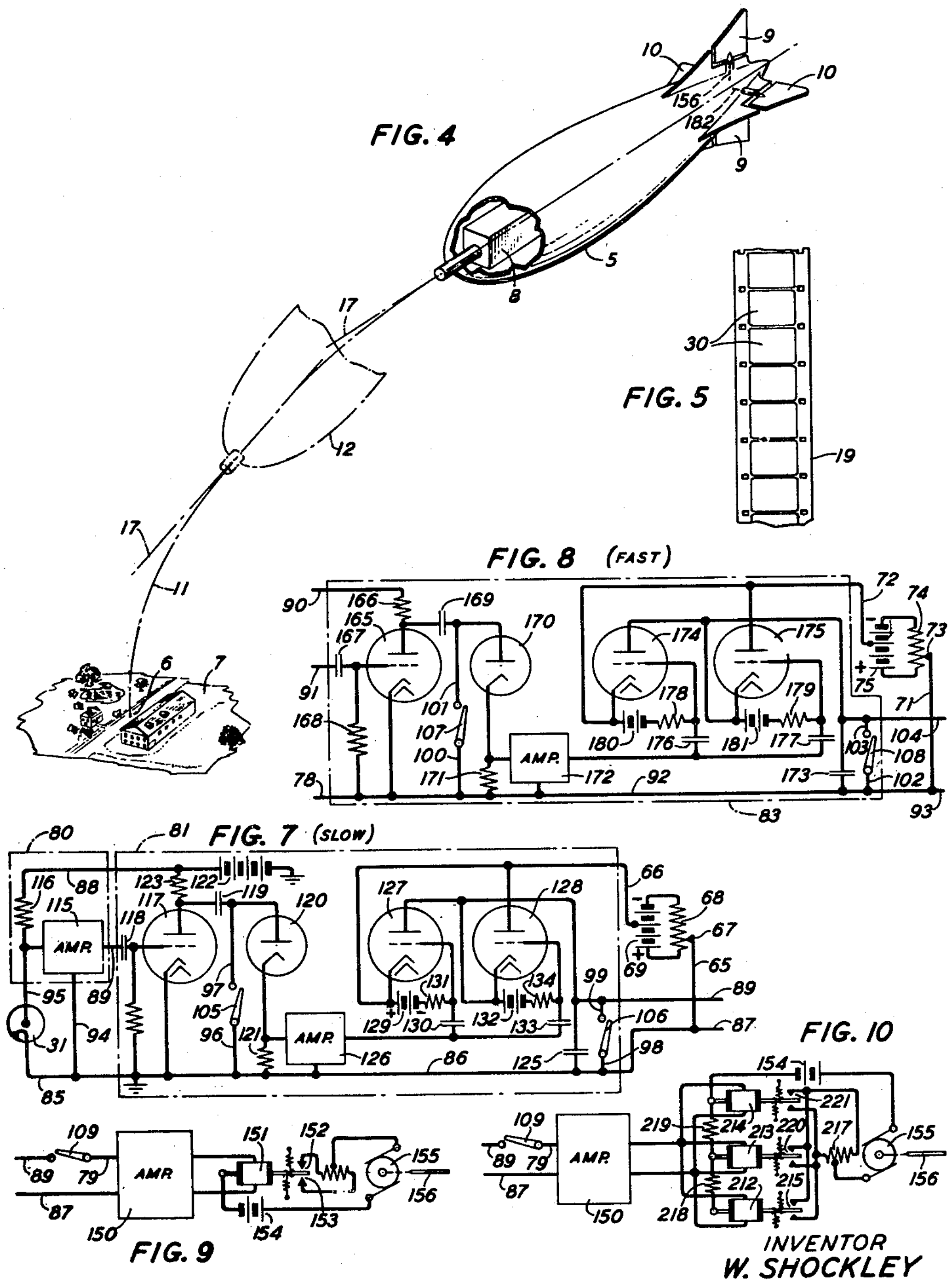
FIG. 4, FIG. 5, FIG. 8 (FAST), FIG. 7 (SLOW), FIG. 9, FIG. 10
INVENTOR
W. SHOCKLEY
BY
Stanley B. Kent
ATTORNEY

RADIANT ENERGY CONTROL SYSTEM

Filed March 19, 1948 3 Sheets-Sheet 3

INVENTOR
W. SHOCKLEY
BY Stanley B. Kent
ATTORNEY

United States Patent Office 2,884,540

Patented Apr. 28, 1959

2,884,540

RADIANT ENERGY CONTROL SYSTEM

William Shockley, Madison, N.J., assignor to Bell Telephone Laboratories, Incorporated, New York, N.Y., a corporation of New York Application March 19, 1948, Serial No. 15,831

12 Claims. (Cl. 250—200)

This invention relates to radiant energy control systems and more particularly to systems and methods of control comprising the matching of patterns.

An object of the invention is to provide an improved system of control dependent upon the matching of patterns having two dimensional characteristics.

Another object of the invention is to provide improved methods of effecting controls by matching radiant energy produced patterns.

A feature of the invention consists in comparing an optical image of a field of view with a transparency of at least a portion of the same field by moving said image and said transparency relatively to each other for comparing such two patterns in a multiplicity of relative positions and after completing the comparison effecting a control operation dependent upon the relative positions of the two patterns at the time that the best match thereof occurred.

The maximum amount of light will be transmitted through the transparency when the high lights of the image and the transparency coincide. The maximum change in transmitted light will occur just as the patterns are shifted into or out of registry. Another feature of the invention consists in utilizing the impulsive increase in intensity of the transmitted light as the patterns shift into registry to effect the desired control operation.

A further feature of the invention consists of making the control dependent upon the magnitude of the change in signal in going through the match condition as compared to the magnitude of the signals generated in non-match conditions.

These features of the invention may be utilized in a large number of embodiments of the invention.

In order to illustrate the basic optical principles involved, let us suppose that the transparency is in the form of a circular disc and that the image falls upon it and is rotated optically about an axis through the center of the disc and perpendicular to its plane.

In some cases where relatively simple patterns are to be compared, it will suffice to consider the peak intensity of the signal. However, a more critical criterion of the matching condition may be obtained by dealing with the rate of change of transmitted light as the matching condition is passed through. The fact that the light intensity is a maximum for the condition of match can be inferred at once from the general mathematical theorem known as the Schwarz inequality. Thus if $L(r,\theta)$ denotes the illumination of the image and $T(r,\theta)$ the transmission coefficient of the transparency, where $r$ and $\theta$ are coordinates of a point in the plane where the image and transparency coincide, then the Schwarz inequality states that $$\int L(r,\theta)T(r,\theta)rdrd\theta \leqq (\int L^2(r,\theta)rdrd\theta \int T^2(r,\theta)rdrd\theta)^{1/2}$$

with the equal sign holding only if $T(r,\theta)$=constant times $L(r,\theta)$. (See Die Mathematischen Hilfsmittel des Physikers, by Dr. Erwin Madelung, Dover Publications, New York, 1943, page 11.) The integral on the left is proportional to the total transmitted light. If L and T differ only in being rotated in respect to each other, then it is clear that the transmitted light will be a maximum when the relative rotation is zero. Furthermore, if the average angular separation between highlights and shadows is $\delta\theta$, the peak in light intensity will occur while the rotation progresses through an angle of about $2\delta\theta$. Hence, a phenomenon particularly characteristic of the match condition will be the presence of a peak of transmitted light about $2\delta\theta$ wide. At non-match conditions peaks $2\delta\theta$ wide will also occur when accidental matching of high lights in transparency and image occur. However, since such accidental matchings will occur only for a few of the high lights on the transparency at any one time, the magnitude of such accidental peaks will be much smaller than for a genuine match. Furthermore, such accidental peaks will in general occur at random and for many relative angular positions of transparency and image, whereas the genuine match peak will occur only once per revolution and be much larger than the accidental peaks.

These distinguishing features of a genuine match permit the design of circuits which will discriminate sharply between good match and poor match conditions. Thus if the transmitted light is detected by a photomultiplier and fed through an amplifier having a broad frequency response peaked near $\omega/2\delta\theta$ where $\omega$ is the angular velocity of relative rotation of image and transparency, then discrimination against signals not having about the right angular width will be achieved. If, furthermore, an automatic volume control circuit is employed which sets the gain level by averaging the highest peaks of each revolution, then the condition of match will be that there is one peak very much above the average level. This embodiment of the invention will be explained further hereinafter.

In another illustrative embodiment of the invention, a mechanism is employed to keep a falling vehicle automatically on a predetermined course toward a landing spot on the ground. An optical lens system is mounted in the head end of the vehicle to produce a real image of the terrain toward which the vehicle is pointing. By means of a mirror disc which is adapted to be oscillated about two axes at right angles to each other, this real image is formed in the plane of a positive transparency representative of the terrain toward which it is desired that the vehicle be pointed. This real image is caused to assume cyclically a multiplicity of positions relative to the transparency by oscillating the mirror relatively slowly about one axis and more rapidly about the other axis which is right angles to the first axis. The real image is rotated by an inverting prism at a rate much faster than the more rapid oscillation of the mirror. At some point during each half oscillation of the mirror in the slow direction of oscillation of the mirror or during each so-called test interval, the real image is shifted into the best matching position and the light transmitted through he transparency is impulsively increased. The light transmitted through the transparency illuminates a photoelectric cell which in turn causes a condenser to be charged through a diode and a resistor. Each increment of charge of the condenser produces a voltage impulse across the resistor which is used to set up a charge in a second condenser representative of the position of the oscillating mirror at the instant when the impulse occurs. The last impulse during each test interval occurs when the best matching occurs and therefore the charge on the second condenser at that time is a function of the position of the oscillating mirror. This second condenser is a so-called memory condenser and the circuit controlling its charge is a so-called memory circuit. The voltage across this memory condenser is used to effect rotation of a motor in the proper direction to correct the course of the vehicle, if it has deviated from the desired course, in the direction indicated by the slow oscillation of the mirror. A second memory circuit controlled by the same photoelectric cell is used to set up a charge on a second memory condenser representative of the position of the oscillating mirror in its fast direction of oscillation at the instant when the best matching occurs. The voltage across this second memory condenser is used to effect rotation of a second motor in the proper direction to correct the course of the vehicle, if it has deviated from the desired course, in the direction indicated by the fast oscillations of the mirror. By means of these two adjustments the vehicle is kept effectively on the desired course.

Inasmuch as the real image of the terrain at the landing spot and its environment will change in size with the distance of the vehicle from the landing spot, means is provided to bring a plurality of transparencies successively into the position to be compared with the real image. These transparencies may be frames of a motion picture film taken by a camera at successive positions along the desired path. The change from one transparency to another may be effected in any desired manner as by a timing mechanism or in the case of a falling vehicle by an altimeter controlled stepping mechanism.

In the practice of this invention, rotation of the transparency instead of rotation of the real image is contemplated for the comparing of the patterns. Other circuits for controlling the direction of travel of the vehicle under control of the maximum change of illumination of the photoelectric cell are contemplated. The use of patterns produced in other ways than by photography and optical means are also contemplated.

A more detailed description of the invention follows having reference to the accompanying drawings.

Fig. 4 illustrates schematically a guided landing vehicle embodying this invention.

Fig. 5 illustrates a strip of film for use on the vehicle of Fig. 4.

Fig. 7 is a schematic diagram of certain of the electrical equipment of the mechanism of Fig. 6.

Fig. 8 is a schematic diagram of certain additional electrical equipment of the mechanism of Fig. 6.

Figs. 9 and 10 are schematic diagrams of alternative schemes for controlling the rudders of the vehicle of Fig. 4.

The same reference characters are used to identify identical elements in the several figures of the drawing.

Figure 1:
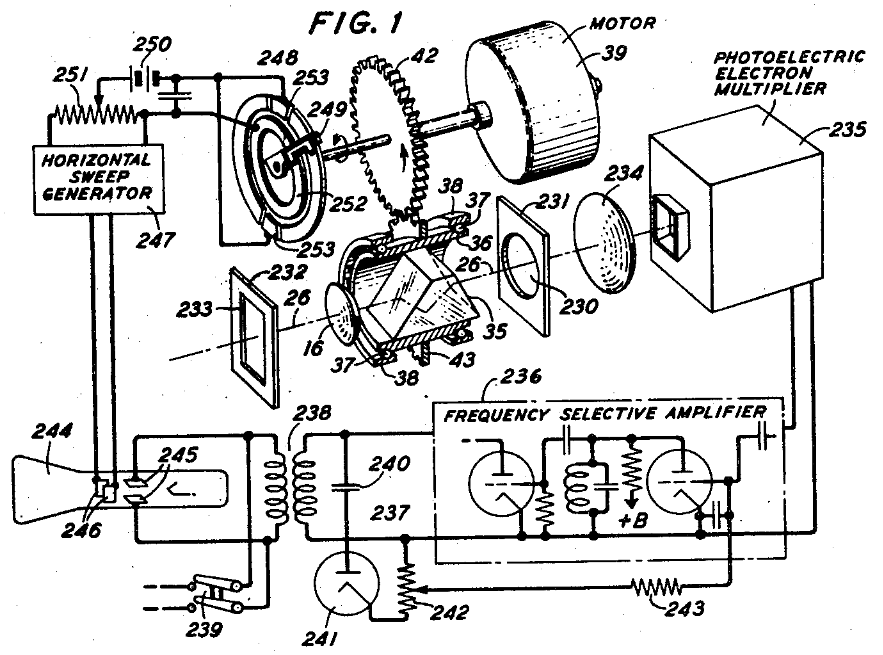
Fig. 1 illustrates one embodiment of the invention suitable for producing electrical control currents.

Referring now to Fig. 1 there is illustrated the embodiment of the invention hereinbefore mentioned which comprises a photomultiplier, a selective amplifier and an automatic volume control circuit. A transparency 230 in the form of a circular disc is mounted in a holder 231 so that the axis 26 of an objective lens 16 passes through the center of the disc perpendicular to its plane. An object 232 carrying a pattern 233 to be compared with the patterns of the transparency 230 is mounted with respect to lens 16 so that an image of the pattern 233 is formed substantially in the plane of the transparency 230 and so that the axis 26 intersects both patterns at the same point. By means of a rotatable inverting prism 35 located between the lens 16 and the transparency 230 the image may be rotated with respect to the transparency to cyclically effect a matching of the patterns. The prism 35 is mounted for rotation about the optical axis 26 with the base of the prism 35 substantially parallel to the axis 26. The prism 35 is mounted inside of a cylindrical tube 36 which is supported for rotation on ball bearings 37 running in races 38. The real image formed by lens 16 is rotated about the axis 26 by the rotation of the prism 35. The image will be rotated two complete turns for each revolution of the prism 35. The rotation of the prism 35 is effected by rotation of the cylindrical tube 36 by the motor 39 through gears 42 and 43. These gears rotate in the directions shown by the arrows.

The pattern 233 may be illuminated in any suitable manner to effect the formation of the image. The light which passes through the transparency 230 is gathered by a lens 234 and directed to the light-sensitive cathode of photomultiplier 235. The output from the photomultiplier 235 is impressed on the frequency selective amplifier 236. The output of the amplifier 236 is passed through an A.V.C. (automatic volume control) circuit 237, a transformer 238, and a double-pole switch 239 to any circuit to be controlled.

The speed of rotation of the prism 35 and the selectivity of the amplifier 236 are correlated in the manner set forth hereinbefore, that is, the frequency response of the amplifier is peaked near $\omega/2\delta\theta$ where $\omega$ is the angular velocity of relative rotation of the image and the transparency.

The A.V.C. circuit comprises a condenser 240, a diode 241 and a resistor 242 connected in series across the output terminals of amplifier 236. All or a portion of the voltage across resistor 242 is fed back through resistor 243 to the input circuit of one or more stages of the amplifier 236 in such a way as to limit the average value of the alternating current output averaged over a period several times $2\delta\theta$.

The wave shape of the output current may be observed in an oscilloscope 244. The voltage of the wave shape to be observed is impressed on the vertical deflecting plates 245, 245. The horizontal sweep voltage which is impressed on horizontal deflecting plates 246, 246 is provided by a horizontal sweep generator 247 under control of a pulse producing commutator 248. The contactor 249 of commutator 248 is rigidly mounted on the shaft of gear 42 and rotates at the same rate as prism 35. Twice for each revolution of the contactor 249 a circuit is closed for battery 250 through resistor 251 by the connection between inner ring 252 and sectors 253, 253 of the outer ring of commutator 248. The resulting impulses of curernt through resistor 251 trigger the horizontal sweep generator 247 once for each revolution of the image with respect to the transparency 230. A single sector 253 may be used.

Figure 2:
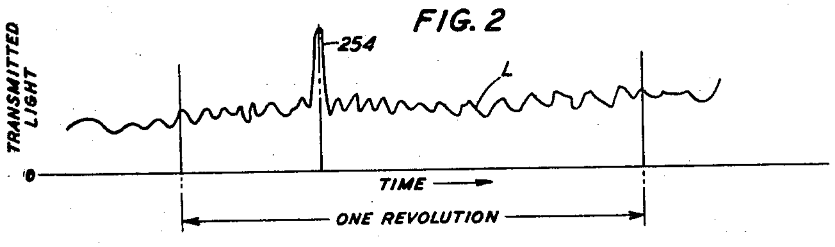
Figs. 2 and 3 are diagrams illustrating respectively the nature of the illumination of the light-sensitive electric device of Fig. 1 and the resulting electrical control current.

A characteristic illumination of the cathode of the photomultiplier 235 is represented by graph L of Fig. 2. The time indicated as one revolution is the time required for the image to make one revolution with respect to the transparency 230, that is, the time required for the prism 35 to make a half revolution. The position of substantial matching is represented by the peak 254 which, as shown, is approximately twice the average of the peaks due to accidental matching of high lights.

Figure 3:
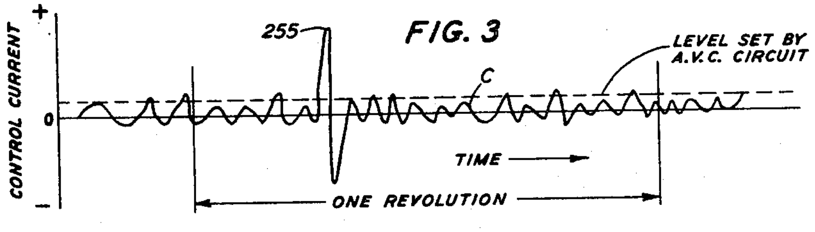

A characteristic wave shape of the output current from the A.V.C. circuit is represented by the graph C of Fig. 3. The enhancement of the peak 255 due to the matched condition by use of an amplifier with suitable frequency characteristics is clearly shown. The time indicated as one revolution has the same significance as in Fig. 2. The amplitude of the peaks resulting from the accidental matching of high lights is relatively small. The position of substantial matching is represented by the peak 255 which is approximately five times the average of the peaks due to accidental matching of the high lights. The graph C of Fig. 3 is characteristic of the pattern which would be seen on the oscilloscope 244.

Referring now to Fig. 4, another illustrative embodiment of the invention comprises a guidable vehicle 5 which it is desired to have land at a point 6 in a designated area 7. The desired path of travel of the vehicle 5 is shown by the dot-dash line 11 and an intermediate position along this path is shown by the outline 12. This vehicle 5 may be launched in any desired manner as from an airplane in flight. The vehicle 5 is provided with a control mechanism 8 mounted in the forward portion of the vehicle 5 and guiding rudders 9, 9 and 10, 10 for changing the direction of travel of the vehicle 5 under control of the mechanism 8. The rudders 9, 9 are effective for directions at right angles to the directions for which rudders 10, 10 are effective.

Figure 6:
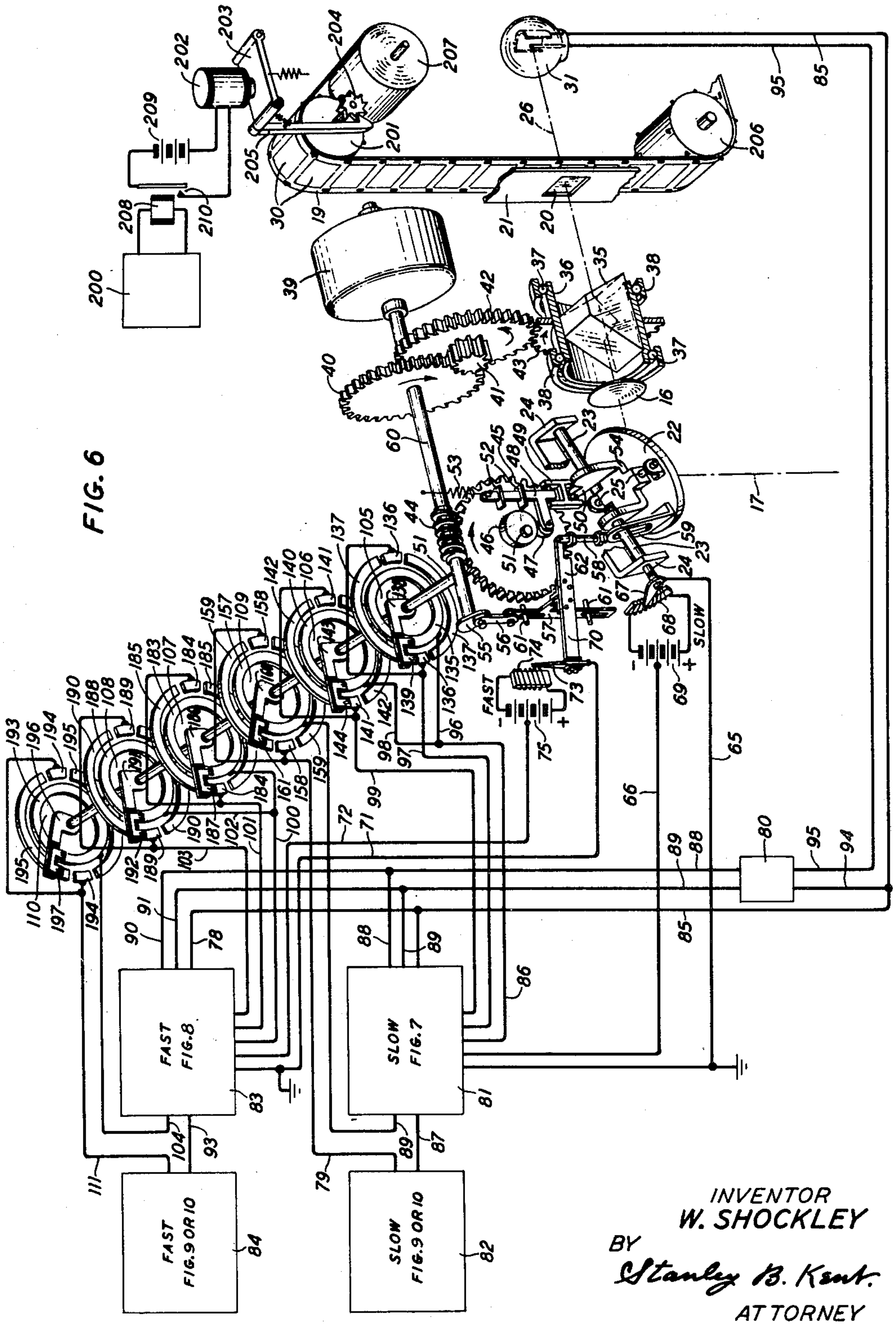
Fig. 6 illustrates mechanism and electrical circuits for guiding the vehicle of Fig. 4.

The control mechanism 8 comprises an optical system which forms an image of the terrain toward which the vehicle 5 is headed or oriented and means for comparing such image with a picture of such terrain and for changing the position of one or both sets of rudders 9 and 10 to change the orientation of the vehicle if the rudders are incorrectly positioned to effect travel in a predetermined desired path. Details of the control mechanism 8 are illustrated in Fig. 6. The optical system of control mechanism 8 comprises an objective lens 16, an oscillatable mirror disc 22, a rotatable inverting prism 35, a film 19 movable past an aperture 20 in a plate 21, and a photoelectric cell 31. The optical axis of the lens 16 represented by dot-dash line 26 after passing on the right through inverting prism 35 passes through the center of aperture 20 to the cathode of the photoelectric cell 31. On the left the axis 26 intersects the lower reflecting face of mirror disc 22. The mirror disc 22 is mounted to oscillate in one direction about the axis of shafts 23, 23 held by bearing supports 24, 24 and in a direction at right angles thereto about the axis of stub shafts 25, 25. When the mirror disc 22 is in the mid-point of its oscillations in both directions the extension of the optical axis 26 after reflection is represented by the dot-dash line 17. The axis 17 for this position of the mirror disc 22 coincides with the axis of vehicle 5 which indicates generally the direction of motion of the vehicle 5 at any given instant. For this position of the mirror disc 22 light rays from the terrain toward which the vehicle 5 is oriented are reflected to the lens 16 which forms a real image of such terrain in the plane of the film 19 at aperture 20. The point of the terrain intersected by the axis 17 is imaged at the film 19 where the axis 26 intersects the film.

Film 19 is of the kind shown in Fig. 5 and comprises a plurality of frames 30. Each frame is a positive transparency of the terrain toward which it is desired to have the vehicle 5 travel at some point in its path of travel and on a scale substantially the same as that of the real image formed at the plane of the film 19 by the optical system of Fig. 6 comprising lens 16, mirror disc 22 and inverting prism 35. Such real image formed by such optical system is in effect the equivalent of a second positive transparency. If such real image coincides substantially with the positive transparency on the film, a maximum amount of light will be transmitted through the positive transparency 30 to energize the photoelectric cell 31. Photoelectric cell 31 is adapted to cooperate in the control of the setting of rudders 9 and 10.

In order to make possible a substantial matching of the real image and the positive transparency as described in the preceding paragraph, the inverting prism 35 is provided between the lens 16 and the film 19. The prism 35 is mounted for rotation about the optical axis 26 in the same manner as described with reference to Fig. 1. For the real image at the plane of film 19 in aperture 20 to substantially match the transparency 30 of the film 19 as described hereinbefore, it is necessary that the prism 35 bear a definite relationship with respect to the terrain toward which the vehicle 5 is directed and the positive transparency 30 of the film 19.

The above-noted relationship is obtained by continuously rotating prism 35 by means of a motor 39 driving the cylindrical tube 36 through gears 40, 41, 42 and 43. These gears rotate in the directions shown by the arrows. A substantial matching of the real image with the transparency will occur twice for each complete rotation of the prism 35 providing that the optical axis 17 is directed toward the same point of the terrain toward which the optical axis of the optical system used in making the transparency was directed and from substantially the same point in the desired path of travel.

Since the setting of the rudders 9 and 10 is dependent in part upon the matching of the real image and the corresponding transparency 30 at successive closely spaced positions during the travel of the vehicle 5, means are provided to effect the matching during successive frequent intervals and to automatically adjust the rudder setting at the end of each interval dependent upon the amount of deviation from the desired path existing at the instant that the best matching of the image and the transparency occurs. In order to determine the amount and the direction of the deviation from the desired path the mirror disc 22 is oscillated about the axes of shafts 23 and 25 during each test interval.

Oscillation of mirror disc 22 about the axis of shafts 23 is effected by motor 39 through a worm gear 44, a driven gear 45, a cam 46, a cam follower 47, a cam driven slide 48, a link 49 and a lever arm 50. The gear 45 and cam 46 are both rigidly secured to a shaft 51. As the shaft 51 rotates the cam driven slide 48 moves up and down in guides 52, the cam follower 47 on slide 48 being held against the cam 46 by a spring 53. The lever arm 50 is rigidly secured to the junction member 54 to which shafts 23 and 25 are connected at right angles to one another. The link 49 is hinged to the lever arm 50 at a point which is offset from the axis of shafts 23. Therefore, as the slide 48 moves up and down, the member 54 is caused to oscillate about the axis of shafts 23. This causes the mirror disc 22 to oscillate about the same axis and any image formed by lens 16 to move transversely across the portion of the film 19 which is in registry with the aperture 20.

Oscillation of mirror disc 22 about the axis of shafts 25 is effected by motor 39 through a crank 55, a connecting rod 56, a slide member 57, a link 58 and a slotted member 59. The crank 55 is secured to the end of a shaft 60 which is the shaft of motor 39. The slide member 57 is guided by pins 61. The link 58 is connected by ball and socket bearings at one end to an arm 62 of slide member 57 and at the other end to slotted member 59. The slotted member 59 is rigidly secured to mirror disc 22 with the slot so arranged that the shaft 23 passes freely therethrough during the oscillation of the mirror disc 22 about the axes of both shafts 23 and 25.

In operation the motor 39 rotates at a uniform speed to effect rotation of the prism 35 about the axis 26, the oscillation of mirror disc 22 about the axis of shaft 23 and the oscillation of mirror disc 22 about the axis of shaft 25. The real image formed by lens 16 at the aperture 20 of the terrain toward which the optical system is directed is cyclically rotated about the axis 26 and moved both transversely and longitudinally of the film 19 at the aperture 20. The transverse movement in each direction occurs during a half revolution of the shaft 51. The longitudinal movement in each direction occurs during a half revolution of the motor shaft 60. A complete rotation of the image occurs for a half revolution of the prism 35. The test interval is the time required for a half revolution of the shaft 51 which is the so-called slow movement and depends upon the speed of rotation of the motor 39 and the gear ratio of the worm 44 and the gear 45. During each small fraction of the test interval, the fractional interval being dependent upon the fineness of matching desired, the real image is moved longitudinally of the film 19 across the aperture 20, the fractional interval being the time of a half revolution of the shaft 60. This is the so-called fast movement. Furthermore, during each small fraction of the fractional interval the real image is completely rotated by a half revolution of the prism 35, the duration of such fractional interval being determined by the gear ratio between the shaft 60 and the cylindrical tube 36 which in turn is dependent upon the desired fineness of matching. In the manner just described, the real image of the terrain toward which the vehicle 5 is oriented is compared with the transparency 30 of the film 19. When the best match occurs, the maximum amount of light will pass through the transparency to the photo-electric cell 31 and the maximum impulse of light will occur as the real image is shifted into the best matching position. By means of the electrical circuits now to be described, such maximum light condition and the orientation of the vehicle 5 at the time it occurs are noted and remembered until the end of each test interval for determining whether or not the rudders 9 and 10 are properly set for the vehicle 5 to traverse the desired path to the landing spot and for making suitable adjustment of one or both of the rudders 9 and 10 if the determination shows that either or both are not set properly.

As mentioned above, the amount of light passing through a transparency 30 of film 19 is indicated by the illumination of photoelectric cell 31. For each position of the mirror disc 22 in its oscillation to produce transverse motion of the real image of the terrain across the film 19 at the aperture 20, a corresponding positive or negative direct current voltage is set up between conductor 65 and conductor 66 by reason of the position of a brush 67 on a potentiometer 68, the upper and lower terminals of which potentiometer are connected respectively to the negative and positive terminals of a battery 69. The brush 67 is insulatingly supported on the end of shaft 23 and moves as a unit with mirror disc 22. For each position of the mirror disc 22 in its oscillation to produce longitudinal motion of the real image of the terrain along the film 19 at the aperture 20, a corresponding positive or negative direct current voltage is set up between conductor 71 and conductor 72 by reason of the position of a slider 73 on a potentiometer 74, the upper and lower terminals of which potentiometer are connected respectively to the negative and positive terminals of a battery 75. Slider 73 is insulatingly supported on an arm 70 of slide member 57 and moves in unison with the oscillation of mirror disc 22 about the axis of shafts 25. Therefore, the voltages developed as a result of the illumination of photoelectric cell 31 and set up between conductors 65 and 66 and 71 and 72, respectively, corresponding to the instantaneous position of mirror disc 22, are available to indicate the deviation of the vehicle 5 from the desired path of travel at the instant that the best match occurs between the real image of the terrain and the transparency 30 of film 19. These voltages are utilized in electrical circuits represented by boxes 80, 81, 82, 83 and 84 of Fig. 6.

The electrical circuit within the box 80, shown in Fig. 7, comprises a vacuum tube amplifier 115 for amplifying electric currents in the photoelectric cell 31 resulting from the illumination of the cell by light transmitted through the transparency 30. The cell 31 is coupled to the amplifier 115 by coupling resistor 116.

The electrical circuit within the box 81, shown also in Fig. 7, takes note of the amplitude of the electrical impulses generated in photoelectric cell 31 and amplified in amplifier 115 and in cooperation with the potentiometer 68 and battery 69 sets up condenser charges which are indicative of the deviation of the vehicle 5 from the desired path in a direction corresponding to positions on the transparency 30 at the aperture 20 transverse to the film 19. This circuit may conveniently be called simply a memory circuit. Deviations noted by the circuit within box 81 correspond to the slow movement of the real image of the terrain across the transparency 30.

A second memory circuit within the box 83 of Fig. 8 takes note of the deviation of the vehicle 5 from the desired path in a direction at right angles to the direction noted by the memory circuit within box 81. Deviations noted by the circuit within box 83, correspond to the fast movement of the real image of the terrain across the transparency 30 which movement is longitudinally of the film 19. The circuit within box 83 is energized in part by the impulses transmitted thereto by amplifier 80 and by voltage from potentiometer 74 and battery 75.

Referring again to the circuit within box 81 of Fig. 7, an amplifying vacuum tube 117 is coupled on the input side to output conductor 89 of amplifier 115 through a condenser 118 and on the output side through a condenser 119 to a diode 120 and a resistor 121. Plate current for vacuum tube 117 is furnished by a battery 122 through a resistor 123. Battery 122 also furnishes the current for photoelectric cell 31 through the resistor 116 within box 80. A switch 105 is connected across the diode 120 and resistor 121 by conductors 96 and 97. The function of the switch 105 is to allow the condenser 119 to be charged to the voltage across the cathode to anode discharge path of vacuum tube 117 at the start of each test interval. The amplifier 115 is so constructed that an impulsive increase of illumination on photoelectric cell 31 causes the grid of vacuum tube 117 to become negative with respect to the cathode so that the anode voltage of tube 117 becomes more positive with respect to the cathode. If there is no change of illumination of photoelectric cell 31 during the time that switch 105 is closed, the charge on condenser 119 will be reduced to a minimum value corresponding to zero potential on the grid of vacuum tube 117. The condenser 119 is charged by current flow through diode 120 and resistor 121 whenever the anode voltage of vacuum tube 117 assumes a value greater than any previous value assumed during each test interval corresponding to a greater illumination of photoelectric cell 31. Accordingly, each time condenser 119 receives an increment of charge, an impulse of current passes through resistor 121 producing an impulse of voltage thereacross. These impulses of voltage across resistor 121 are used to permit an adjustment of the charge on a condenser 125 in accordance with the position of wiper 67 on potentiometer 68. A switch 106 is connected across condenser 125 by conductors 98 and 99. The function of the switch 106 is to discharge condenser 125 between two test intervals.

The impulses of voltage appearing across resistor 121 are amplified in an amplifier 126 to reduce the negative bias on the grids of vacuum tubes 127 and 128 so as to render the tubes conducting if a positive voltage is impressed on their anodes. The grid of tube 127 is negatively biased normally to the cut-off point by a battery 129 through a leak resistor 131 and the impulses from amplifier 126 are impressed on the grid through a condenser 130. The return path from the cathode of tube 127 is through conductor 66, battery 69, potentiometer 68, wiper 67 and conductors 65 and 86. The grid of tube 128 is negatively biased normally to the cut-off point by a battery 132 through a leak resistor 134 and the impulses from amplifier 126 are impressed on the grid through a condenser 133. The return path from the cathode of tube 128 is through condenser 125 and conductor 86. The amplification provided by amplifier 126 is such that a desired minimum impulse of voltage from resistor 121 will render both tubes 127 and 128 conductive to adjust the voltage on condenser 125 dependent upon which of the tubes has a positive voltage applied to its anode. The connections are such that when a positive voltage is applied to the anode of tube 127, a negative voltage is applied to the anode of tube 128 and vice versa. The applied voltages at such times as the grids of tubes 127 and 128 are energized by impulses from amplifier 126 are the algebraic sums of the voltages across condenser 125 and the voltages between conductors 65 and 66 which is dependent upon the then position of wiper 67 of potentiometer 68. Since one or the other of tubes 127 and 128 is capable of conducting current at such times, the charge on condenser 125 will be adjusted, if necessary, automatically to produce a voltage across condenser 125 equal and opposite to that between conductors 65 and 66. Such charge will be retained by condenser 125 unless a greater illumination of the photoelectric cell 31 occurs within the test interval when a new adjustment will be made automatically. Accordingly, at the end of each test interval, a voltage is present across condenser 125 of a value and a polarity indicative of the position of mirror disc 22 in its oscillation about the axis of shafts 23 at the instant when the maximum amount of light is transmitted through transparency 30 of film 19 corresponding to the best matching of the real image of the terrain toward which the vehicle 5 is oriented and the transparency 30 which is a representation of the terrain toward which it is desired that the vehicle 5 should be oriented. Such voltage across condenser 125 is a measure of the deviation of the vehicle 5 both in direction and amount from its desired course and can be used to set the rudders 9, for example, to change the orientation of the vehicle 5 by the proper amount and in the proper direction to restore the vehicle 5 to the desired course.

By reference to Fig. 6, it will be seen that switches 105 and 106 are actually located outside of the box 81, although for convenience these elements are shown within the box 81 in Fig. 7. As shown in Fig. 6, switch 105 comprises an inner contact ring 135 and an outer contact ring consisting of contact segments 136, 136 and idle segments 137, 137. A brush arm 138 secured to the shaft 51 carries a contact brush 139 adapted to bridge the inner and outer contact rings. The segments 136 are connected by conductor 97 and the contact ring 135 is connected by conductor 96 to the circuit elements within box 81 as shown in Fig. 7. For each revolution of the shaft 51, conductors 96 and 97 are twice connected together for short periods of time by the bridging of segments 136 and ring 135. Such connections occur approximately when the mirror disc 22 is at a reversal point in its oscillation, that is, between two test intervals. In other words, the switch 105 of Fig. 7 is closed at the beginning of each test interval for the purpose described hereinbefore.

In a similar manner switch 106 as shown in Fig. 6 comprises an inner contact ring 140, an outer contact ring having contact segments 141, 141 and idle segments 142, 142 and a brush arm 143 secured to shaft 51 and carrying a contact brush 144. The segments 141 are connected by conductor 99 and the contact ring 140 is connected by conductor 98 to the circuit elements within box 81 as shown in Fig. 7. Brush arm 143 is secured to the shaft 51 in substantially the same angular position as brush arm 138 so that switch 106 of Fig. 7 is closed at substantially the same time as switch 105 and for the purpose described hereinbefore.

One arrangement for utilizing the voltage on condenser 125 to adjust the rudders 9 is shown in Fig. 9. The voltage on condenser 125 just before the end of each test interval is impressed on the input circuit of an amplifier 150 by the closing of a switch 109 to complete the circuit through conductors 87 and 89. The output circuit of amplifier 150 is connected to the operating windings of a polar relay 151, the armature of which normally assumes a mid-position between contacts 152 and 153. These contacts and the armature are so connected through a battery 154 to a reversible motor 155, that the motor will rotate in one direction if contacts 152 are closed and in the reverse direction if contacts 153 are closed. Motor 155 is adapted to control the position of rudders 9 through shaft 156. If there is a charge on condenser 125 when switch 109 is closed, one or the other of contacts 152 and 153 will be closed dependent upon the polarity of the charge and the motor 155 will be rotated in a direction to change the setting of rudders 9 to correct for the deviation of vehicle 5 from its desired course, which deviation is indicated by the charge on condenser 125 as explained hereinbefore. If the charge on condenser 125 is negligible when switch 109 is closed, it means that the vehicle 5 was properly oriented during the test interval and no readjustment of the setting of rudders 9 is required and none is made.

The closing and opening of switch 109 is effected as shown in Fig. 6. Switch 109 comprises an inner contact ring 157, an outer contact ring having contact segments 158, 158 and idle segments 159, 159 and a brush arm 160 secured to shaft 51 and carrying a contact brush 161. Segments 158 are connected by conductor 79 to the input circuit of amplifier 150 within box 82 and the inner contact ring 157 is connected by conductor 89 to the upper terminal of condenser 125 within box 81. Brush arm 160 is secured to shaft 51 in such an angular position with respect to brush arms 138 and 143 of switches 105 and 106 that switch 109 of Fig. 9 is closed shortly before the end of each test interval and opened just a moment before switches 105 and 106 of Fig. 7 are closed. As shown in Fig. 6, brush 161 of switch 109 has just moved off of contact segment 158 and brushes 139 and 144 of switches 105 and 106 respectively are in contact respectively with segments 136 and 141.

Rudders 10 are controlled in a similar manner by the circuits within box 83, box 84 and switches 107, 108 and 110 of Fig. 6. The circuit within box 83 as shown in Fig. 8 is essentially the same as that within box 81 as shown in Fig. 7. It comprises a vacuum tube 165 coupled on the input side by conductors 78 and 91 to conductors 85 and 89, respectively, of Fig. 7, that is, to the output terminals of amplifier 80 in parallel with the input terminals of the circuit within box 81. Plate current for vacuum tube 165 is furnished through a conductor 90 and a resistor 166 by the battery 122 of Fig. 7 by way of conductor 88 to which conductor 90 is connected. Coupling condenser 167 and grid leak resistor 168 are included in the input circuit of vacuum tube 165. This circuit like that of box 81 comprises a condenser 169, a diode 170 and a resistor 171. Voltage impulses developed across resistor 171 as condenser 169 receives increments of charge through diode 170 are amplified in an amplifier 172 and used to effect the adjustment of the charge on a condenser 173 in accordance with the position of the mirror disc 22 in its oscillation about the axis of shafts 25 at the time of the best matching of the real image toward which the vehicle 5 is oriented and the transparency 30 of film 19 in registry with the aperture 20. Such adjustment of the charge on condenser 173 is dependent upon the position of slider 73 on potentiometer 74 and the existing charge on condenser 173 when the amplified impulses from amplifier 172 renders vacuum tubes 174 and 175 conducting by reason of the impulse acting through condensers 176 and 177 and grid leak resistors 178 and 179 to overcome the negative bias produced by batteries 180 and 181. The voltage on condenser 173 operates through a circuit identical with that of Fig. 9 to control the setting of rudders 10 by operating on a shaft 182 of Fig. 4 which corresponds to shaft 156 of Fig. 9.

Switches 107 and 108 are used to condition the charges on condensers 169 and 173 between test intervals. These switches 107 and 108 are actually positioned outside of the box 83 as shown in Fig. 6. Switch 107 comprises an inner contact ring 183, an outer contact ring having contact segments 184, 184 and idle segments 185, 185 and a brush arm 186 secured to shaft 51 and carrying a contact brush 187. The segments 184 are connected by conductor 101 and the inner contact ring 183 is connected by conductor 100 to the circuit elements within box 83 as shown in Fig. 8. Switch 108 comprises an inner contact ring 188, an outer contact ring having contact segments 189, 189 and idle segments 190, 190 and a brush arm 191 secured to shaft 51 and carrying a contact brush 192. The segments 189 are connected by conductor 103 and the inner contact ring 188 is connected by conductors 102 and 100 to the circuit elements within box 83 as shown in Fig. 8. Brush arms 186 and 191 are secured to shaft 51 in substantially the same angular position as brush arms 138 and 143 so that switches 107 and 108 are closed at substantially the same times as switches 105 and 106 and for similar purposes.

A switch 110 shown only in Fig. 6 functions to connect a circuit identical with that of Fig. 9 for control of rudders 10 by the voltage across the terminals of condenser 173 of Fig. 8. Switch 110 comprises an inner contact ring 193, an outer contact ring having contact segments 194, 194 and idle segments 195, 195 and a brush arm 196 secured to shaft 51 and carrying a contact brush 197. The segments 194 are connected by a conductor 111 to the input circuit of the amplifier within box 84 which corresponds to amplifier 150 of Fig. 9, and the inner contact ring 193 is connected by conductor 104 to the upper terminal of condenser 173 within box 83 of Fig. 8. The brush arm 196 is secured to the shaft 51 in substantially the same angular position as brush arm 160 of switch 109 so that switch 110 is closed shortly before the end of each test interval and opened just a moment before switches 107 and 108 of Fig. 8 are closed. As shown in Fig. 6, brush 197 of switch 110 has just moved off of segment 194 and brushes 187 and 192 of switches 107 and 108 are in contact respectively with segments 184 and 189.

As the motor 39 drives the mechanism of Fig. 6 while the vehicle 5 travels substantially along the path 11 toward the desired landing point 6, the circuits of Figs. 7, 8 and 9 function to automatically adjust the setting of rudders 9 and 10 once near the end of each test interval in accordance with the direction of deviation from the desired path at the time that the best match occurs between the real image of the terrain toward which the vehicle 5 is oriented and the transparency 30 of film 19 then in registry with the aperture 20. A plurality of transparencies 30 in film 19 are required because of the changing scale of size of the real image of the terrain formed by the lens 16. As the vehicle 5 moves toward the landing point 6 the scale increases. For a given optical system, such scale of size is a function of the altitude of a descending vehicle. Accordingly, in the arrangement of Fig. 6, the transparencies 30 of film 19 are brought into registry with aperture 20 by mechanism under the control of an altimeter 200. The film 19 is pulled past aperture 20 by a sprocket drum 201 driven by a stepping relay 202, an armature 203 of which drives a ratchet wheel 204 by means of a dog 205. The ratchet wheel 204 is so proportioned with respect to the sprocket drum 201 that a complete succeeding transparency 30 is brought into registry with the aperture 20 for each energization of the relay 202. Film 19 is drawn from a storage reel (not shown) over a sprocket drum 206 and delivered to a take-up reel 207, driven in any suitable manner. The altimeter 200 energizes a relay 208 at predetermined altitudes to close the energizing circuit of relay 202 through a battery 209 and normally opened contacts 210 of relay 208. The altimeter 200 may be of the type disclosed in Crane et al. Patent 2,265,149, issued December 9, 1941. Relay 208 corresponds to relay 20 of the patent and relay 202 corresponds to the device to be controlled. The altimeter disclosed in this patent may be set to operate relay 20 at any desired plurality of altitudes.

The transparencies 30 on film 19 may be positive prints from a negative film exposed with the same image forming optical system driven by the same altimeter controlled stepping mechanism and mounted on a vehicle traveling along the desired path 11 to the landing point 6.

The rudder control mechanism of Fig. 9 operates to yield a single speed of directional control. A modified mechanism which may be substituted for the mechanism of Fig. 9 is illustrated in Fig. 10. Such modified mechanism takes into account both the direction of the deviation and the amount of the deviation in making any indicated adjustment of the rudders 9 and 10. Instead of utilizing a single polar relay 151 as in Fig. 9, three polar relays 212, 213 and 214 are used. The windings of these relays are connected in parallel to the output terminals of amplifier 150. The upper contacts are connected in parallel to the motor 155 and the battery 154 to cause upon closure of any one or any plurality of these contacts, rotation of the motor in one direction. The lower contacts are connected in parallel to the motor 155 and the battery 154 to cause upon closure of any one or any plurality of these contacts, rotation of the motor in the opposite direction. Relay 212 is the most sensitive relay and operates on small deviations as indicated by the position of wiper 67 or slider 73 of potentiometers 68 and 74, respectively. Relay 214 is the least sensitive and operates only when a relatively large deviation is indicated. Relay 213 is of intermediate sensitivity. Therefore, for small deviations relay 212 alone operates to close one or the other of its contacts to drive motor 155. Assume that the upper contact 215 of relay 212 is closed, a circuit for motor 155 is completed from the positive terminal of battery 154 through the armature of motor 155 and the right-hand portion 217 of the series winding of motor 155, contacts 215 of relay 212, resistors 218 and 219 to the negative terminal of battery 154. Because of series resistors 218 and 219, the motor 155 will rotate relatively slowly to its new position. If a larger deviation occurs in the same direction during another test interval, both relays 212 and 213 will operate and the upper contact 220 of relay 213 will be closed thereby short-circuiting resistor 218. Under these conditions motor 155 will rotate faster to its new position since only resistor 219 is connected in series with its energizing circuit. For maximum deviation in the same direction, all of the relays 212, 213, 214 will be energized to close respectively their upper contacts 215, 220 and 221. The closing of contacts 221 of relay 214 short-circuits both resistors 218 and 219 and the motor 155 rotates at maximum speed to its new position. The closing of one or more of the lower contacts of relays 212, 213 and 214 similarly causes the motor to rotate to its new position or positions in the opposite direction at different speeds.

Figure 11:
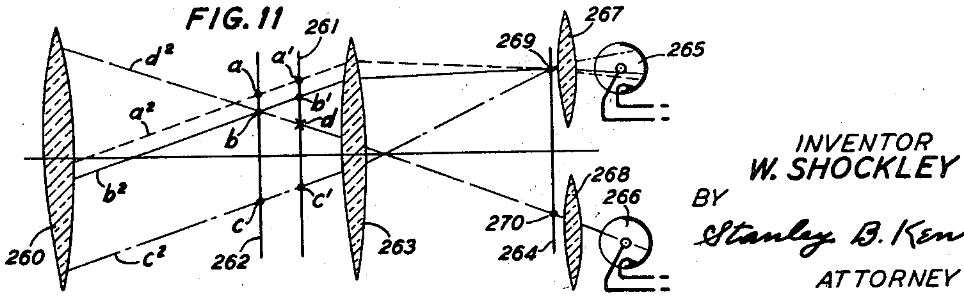
Fig. 11 is a schematic optical system for indicating the direction of displacement of matched patterns.

A further means of alignment is illustrated in Fig. 11. The real image is formed by lens 260 and brought to focus in front of the plane 261 of the transparency, that is, for example in the plane 262, and is not in focus on the transparency plane. Rays from the real image passing through the transparency fall upon a lens 263. In the plane 264 at the focal length behind this lens 263, parallel rays emerging from the transparency are brought to focus at a point. In this way all rays passing upward in going through the transparency are separated from those passing downward and the two sets are concentrated on photocells 265 and 266, respectively, by lenses 267 and 268. In order to see how this device may be used to control direction or centering, let us suppose that the transparency rotates while the image remains fixed. Then if there is equal response in the two photocells, the central ray from the image will correspond to the center of the transparency. However, if photocell 265 has the larger signal, it means that the center of the transparency corresponds to a point downward from the center on the image; that is, the rays going to photocell 265 correspond to rays directed so as to shift the image upward in superposing it on the transparency. By these means, once a position of approximate match is obtained, a comparison of the signals from cells 265 and 266 will show whether the optic axis of the system producing the image points upward or downward from the point corresponding to the center of the transparency. This information can then be used for control purposes in a variety of ways.

This action is illustrated by certain reference rays in Fig. 11. The real image formed at plane 262 by lens 260 is represented as having three reference high lights *a*, *b* and *c*. The transparency in plane 261 is represented as having corresponding reference high lights *a'*, *b'* and *c'*. Each of the high lights *a'*, *b'* and *c'* is offset upwardly by the same amount from the high lights *a*, *b* and *c*, so that the light rays $a^2$, $b^2$ and $c^2$ passing from lens 260 to lens 263 through these high lights, respectively, are parallel. After refraction in lens 263 the rays $a^2$, $b^2$ and $c^2$ pass through the point 269 in the principal focal plane 264 of lens 263. These rays are gathered by lens 267 and directed to photocell 265. Therefore, for every high light point of the image in plane 262 there will be a corresponding high light point of the transparency in plane 261 through which light rays will reach the photocell 265.

With the image and transparency so offset there will be probably some high lights of the transparency in the plane 261 so located that light from non-corresponding high lights of the image in plane 262 will pass therethrough. Point *d* in plane 261 represents such a high light with respect to reference high light *b* in plane 262. The light ray $d^2$ passing from lens 260 to lens 263 through high lights *b* and *d* is refracted by lens 263 to the point 270 in the principal focal plane 264 of lens 263. This ray $d^2$ is gathered by lens 268 and directed to photocell 266. The number of such accidental rays will be relatively small, so that the illumination of photocell 265 will greatly exceed that of photocell 266 when the image in plane 262 is offset downwardly from the transparency in plane 261.

The principal involved here can obviously be extended by using three or more photocells to give information regarding right and left, as well as upward and downward offsetting of the image in plane 262 with respect to the transparency in plane 261.

The image may be formed alternatively behind the transparency, that is, between the transparency and the lens 263.

In the guided vehicle example of practice described in detail hereinbefore, it is assumed that the vehicle 5 is dropped from an airplane and falls freely to the landing point 6 over the desired path 11. In order to prevent injury to the vehicle means may be provided to arrest its fall before it reaches the ground. Other embodiments will occur to those skilled in this art. For example, the invention may be embodied in a mechanism for comparing a real image of a person seeking admission to an enclosure with a series of transparencies of persons entitled to be admitted and if the person seeking admission is one of those entitled to be admitted removing a barrier such as unlocking or opening a door to admit such person.

Another application of features of the invention is to vending machines which would accept paper money. By comparing a proffered bill with a transparency of a genuine bill of the same denomination and issue, the accuracy of the engraving could be used to eliminate the acceptance of a forgery. In this use of the invention, the comparison could be made to advantage area by area rather than of the bill as a whole. The denomination as well as the genuineness of the proffered bill would be determined.

Another application might be in post office work where combining features of the invention with a weighing scale would permit automatic checking of weight and stamp values on mail.

The invention could also be used in factory production to sort items and inspect them.

Types of patterns other than real images and transparencies may be used in certain embodiments of the invention.

All such modified embodiments come within the purview of the appended claims.

What is claimed is:

1. A control system comprising a reference pattern, means to produce a comparison pattern, means to compare said patterns including means to rotate one of said patterns about a point in said one pattern, and means to actuate automatically a control dependent upon the substantial matching of said patterns.

2. An orientation system comprising a pattern representative of the environs of a target toward which a movable object is to be oriented, means on a movable object to produce a comparable type of pattern of the region toward which said object is oriented, means to compare said patterns, and means controlled by said comparison means to change the orientation of said movable object in accordance with information obtained from said comparison means.

3. A guiding system comprising a pattern representative of a region to a portion of which a movable vehicle is to be guided, means on a movable vehicle to produce a pattern of the region toward which the vehicle is directed, means to move said patterns relatively to each other, and means to indicate any divergence between the direction of movement of said vehicle and the direction toward the portion of said region to which said vehicle is to be guided when said patterns are in relative relationship to most nearly match each other.

4. A method of matching two dimensional patterns which comprises positioning one of said patterns in a plane, superimposing a second pattern in the same or an adjacent parallel plane, moving said second pattern cyclically at one period in one coordinate in said plane with respect to said first pattern, moving said second pattern cyclically at a different period in a coordinate at right angles to said first coordinate in said plane with respect to said first pattern, and rotating said second pattern cyclically at a still different period in said plane with respect to said first pattern.

5. A method of controlling a mechanism which comprises relatively moving two superimposed patterns to effect a substantial matching thereof, utilizing the change in the amount of light transmitted through said patterns incident to effecting said matching to set up a charge on a condenser representative of said light change, and means to control a mechanism in accordance with said condenser charge.

6. In a guiding mechanism, a transparency representing the terrain to a portion of which a vehicle is to be guided, means on a vehicle to be guided for producing an image of the terrain toward which said vehicle is moving, means to compare said image with said transparency cyclically and produce electrical impulses indicative of the accuracy of matching of said image and said transparency, means indicating the orientation of said vehicle with respect to said terrain at each instant of said comparison cycle, a condenser charged under the joint control of said comparison means and said orientation indicating means, a mechanism to be guided, and means to control said mechanism in accordance with the charge on said condenser.

7. An electrical memory circuit comprising a source of voltage pulses, means to control a charge on a condenser by voltage pulses from said source in such a manner that the charge is changed in one direction only and only by pulses which are larger than preceding pulses within a given cycle, a source of variable voltage, means to charge a second condenser to the voltage of said source of variable voltage at the instant when the maximum voltage pulse is produced by said source of voltage pulses within said given cycle.

8. A vehicle guiding system comprising a vehicle to be guided, an optical system on said vehicle for forming an image of a field of view toward which said vehicle is directed, a transparency of a field of view to a portion of which it is desired to guide said vehicle located substantially in the plane of the image formed by said optical system, a mirror oscillatable about two axes at right angles to each other, a first means to oscillate said mirror about one of said axes to move said image across said transparency in one direction, a second means to oscillate said mirror about the other of said axes to move said image across said transparency in a direction at right angles to said one direction, means to rotate said image about the optical axis of said optical system, a photoelectric cell illuminated by the image forming light which passes through said transparency, means including an amplifier having a discharge path to amplify electrical impulses produced by said cell, a series circuit comprising a condenser, a diode and a resistor connected across the discharge path of said amplifier, a first source of voltage having polarity and amplitude dependent upon the position of said mirror in its oscillation about one of said two axes, a second source of voltage having polarity and amplitude dependent upon the position of said mirror in its oscillation about the second of said two axes, a first control condenser corresponding to said first source of voltage, a second control condenser corresponding to said second source of voltage, means to charge said first control condenser to a voltage and polarity dependent upon the voltage and polarity of said first source of voltage at the instant that charging current for said series condenser flows through said resistor, means to charge said second control condenser to a voltage and polarity dependent upon the voltage and polarity of said second source of voltage at the instant that charging current for said series condenser flows through said resistor, guiding means on said vehicle to control the direction of movement of said vehicle, and means to control said guiding means in accordance with the charges on said first and second control condensers at the limit of oscillation of said mirror about one of said two axes.

9. A device for producing electrical current by comparison of optical patterns comprising a transparency pattern, a comparison pattern, means to rotate said patterns with respect to each other at a predetermined angular velocity, an electro-optical transducer absorbing the light passing through both said patterns and supplying corresponding electrical power, and an amplifier for the electrical power supplied by said transducer having a broad frequency response peaked near the value obtained by dividing said angular velocity by twice the average angular separation between the high lights and shadows of said patterns.

10. A device for producing electrical current by comparison of optical patterns comprising a transparency pattern, a comparison pattern, means to rotate said patterns with respect to each other at a predetermined angular velocity, an electro-optical transducer absorbing the light passing through both said patterns and supplying corresponding electrical power, an amplifier for the electrical power supplied by said transducer having a broad frequency response peaked near the value obtained by dividing said angular velocity by twice the average angular separation between the high lights and shadows of said patterns, and an automatic volume control circuit controlling the output of said amplifier.

11. An electro-optical system for producing alignment current comprising an optical pattern in the form of a transparency, means to position a comparison pattern parallel to but removed a small distance from said transparency, a positive lens positioned to receive light passing through both said patterns, and means including a light sensitive electrical device located close to the principal focal plane of said positive lens for intercepting light rays passing through a limited area of said plane entirely to one side of the optical axis of said positive lens.

12. An electro-optical system for producing alignment current comprising an objective lens, a positive lens coaxial with but separated from said objective lens, an optical pattern in the form of a transparency located between said lenses and axially removed from the image focal point of said objective lens, a plurality of secondary positive lenses located near the principal focal plane of said first-mentioned positive lens, each secondary lens being wholly to one side of the axis of said first-mentioned positive lens, and light sensitive electric devices individual to said secondary positive lenses adapted to be energized by light gathered by said secondary positive lenses and coming from said first-mentioned positive lens.

References Cited in the file of this patent

UNITED STATES PATENTS

| | | |
|---|---|---|
| 2,035,780 | Beardsley et al. | Mar. 31, 1936 |
| 2,155,248 | Adams et al. | Apr. 18, 1939 |
| 2,192,529 | Thomas et al. | Mar. 5, 1940 |